United States Patent [19]

Savage

[11] 4,391,317

[45] Jul. 5, 1983

[54] BAND DEVICE FOR RETAINING A TIRE ON A WHEEL RIM

[76] Inventor: Bernard J. Savage, 7 Seymour Mews, London W.1, England

[21] Appl. No.: 292,706

[22] Filed: Aug. 13, 1981

[30] Foreign Application Priority Data

Aug. 15, 1980 [GB] United Kingdom ............... 8026636

[51] Int. Cl.³ .................. B60B 25/12; B60B 21/10; B60C 29/00
[52] U.S. Cl. ...................... 152/330 RF; 24/20 LS; 24/282; 152/342; 152/349; 152/381.5; 152/381.6; 403/344
[58] Field of Search ............. 192/152, 330 RF, 347, 192/366, 381.5, 365, 381.6, 339, 349, 340, 350, 342; 24/284, 285, 282, 20 R, 20 LS, 20 EE; 403/344; 301/95-98

[56] References Cited

U.S. PATENT DOCUMENTS

| 1,546,141 | 7/1925 | Lippert | 152/366 |
| 2,713,372 | 7/1955 | Darrow | 152/342 |
| 3,999,587 | 12/1976 | Mitchell | 152/381.5 X |
| 4,122,882 | 10/1978 | Fisher et al. | 152/381.6 X |

FOREIGN PATENT DOCUMENTS

| 14236 | of 1928 | Australia | 152/381.6 |
| 14097 | 8/1980 | European Pat. Off. | 152/381.6 |
| 2038727 | 7/1980 | United Kingdom | 152/381.6 |

Primary Examiner—Jerome W. Massie
Assistant Examiner—Thomas Bokan
Attorney, Agent, or Firm—Fleit, Jacobson & Cohn

[57] ABSTRACT

A band device for retaining a tire on a wheel rim in the event that the tyre should become deflated, which band device comprises a first band portion which is part circular for substantially its entire length, a second band portion which is part circular for substantially its entire length and which is substantially the same size as the first band portion, a link portion which is part circular for substantially its entire length and which is for joining the first and second band portions together at one end, and fastener means for joining the first and second band portions together at their other ends whereby the band portions and the link portion are retainable in position around a base of a wheel rim, the link portion having an apertured part for receiving a valve of a tube for a tire.

6 Claims, 3 Drawing Figures

BAND DEVICE FOR RETAINING A TIRE ON A WHEEL RIM

This invention relates to a band device for retaining a tyre on a wheel rim in the event that the tyre should become deflated. This invention also relates to a wheel rim having the band device and to a complete wheel comprising the band device, the wheel rim and a tyre. The tyre may be a tubeless tyre or there may be a tube inside the tyre.

Band devices for retaining a tyre on a wheel rim in the event that it should become deflated are known. The band devices are effective to enable the tyre to remain on the wheel rim for a predetermined period after loss of air pressure from a tyre on the wheel rim.

It is an aim of the present invention to provide a band device which is easy to manufacture and which is effective in use.

Accordingly, this invention provides a band device for retaining a tyre on a wheel rim in the event that the tyre should become deflated, which band device comprises a first band portion which is part circular for substantially its entire length, a second band portion which is part circular for substantially its entire length and which is substantially the same size as the first band portion, a link portion which is part circular for substantially its entire length and which is for joining the first and second band portions together at one end, and fastener means for joining the first and second band portions together at their other ends whereby the band portions and the link portion are retainable in position around a base of a wheel rim, the link portion having an apertured part for receiving a valve of a tube for a tyre, the link portion being hooked at each end for connecting to inwardly directed ends of the first and second band portions whereby the link portion is positioned in use on the side of the band device that is adjacent the base of the wheel rim so that the inwardly directed pressure of the tyre serves to bind the first and second portions and the link portion tighter around the base of the wheel rim with increasing pressure, and the band device including a plurality of legs which are secured at spaced apart intervals to the first and second band portions on the side of the band device that is adjacent the base of the wheel rim, the base of the wheel rim having a well with an open mouth, and the legs being locatable in the well such that they support the first and second band portions in a well-blocking position at the mouth of the well and such that they allow the first and second band portions to flex with the wheel rim.

The band device of the present invention can be used with tubed and tubeless tyres. With a tubed tyre, the apertured part in the link portion will receive the valve of the tube. With a tubeless tyre, the apertured part of the link portion will not be used. It will thus be apparent that the band device of the present invention can continue to be used in the event that a tubeless tyre should become so badly punctured that a tube is required to be inserted inside the tyre.

Since the link portion will effectively be seated on the floor of the well, it will be apparent that if it should be necessary to use a tube, the tube cannot work its way underneath the link portion and thereby possibly chaff on the link portion, or get pinched by the link portion, and rupture. The tube can obviously engage the exposed surface of the band device but this should not cause any safety problems as there is very little movement of the tube at its inside diameter during use. It is the outside diameter of the tube and the walls of the tube where the greatest movement takes place and where the greatest danger of tube rupture occurs. Also, the band device will normally be covered with anti-chafe material in the usual manner known for band devices.

The link portion may be provided with an anti-chafe patch. The anti-chafe patch may be rivetted, screwed or secured by adhesives to the link portion.

Preferably, the first and second band portions are slotted adjacent one end, the slots each being in the shape of a cross with a pair of transversely extending arms for enabling the fastener means to be inserted in position on the first and second band portions when the first and second band portions are in position around the base of the wheel, the fastener means comprising a screw threaded bolt, a screw threaded bar nut, and a bar washer. Such fastener means are easily passed through the shaped slots in the first and second band portions and the screw threaded bolt can then be screwed tightly into the screw threaded bar nut using an appropriate tool such for example as a T-bar socket head tightening tool. With some of the known band devices, it has been necessary to have at least part of the fastener means in position on a band portion before assembly of the band portion around the base of a wheel rim. Sometimes an operator will forget to do this and sometimes it is just not convenient to have the fastener means in position when fixing the band portion. This problem is obviated in the embodiment of the present invention wherein the slots enable the fastener means to be inserted after the first and second band portions have been located in position around the base of the wheel rim. The fastener means may also be used with any position of the well in a wheel rim.

The apertured part in the link portion will usually be of a V-shape. It is to be appreciated however that other shapes such for example as a U-shape may be employed.

When the band device of the present invention forms part of a complete wheel with rim and tyre, the tyre is advantageously provided with a chemical sealant. The chemical sealant is inside the tyre and if the tyre becomes punctured then the sealant moves to the puncture and seals the puncture as the sealant comes into contact with the air. Obviously, if the puncture is too large, then the sealant will not work. The sealants which are known and presently employed are invariably corrosive and, if the first and the second band portions and the link portion are made of steel, then the steel should be coated with an anti-rust material. The steel may be coated with zinc. If desired, the first and second band portions and the link portion may be made of stainless steel. Usually, the fastener means and the box sections (when present) will be made of the same material as the first and second band portions and the link portion. It is obviously desirable that the entire band device does not rust when exposed to the chemical sealant.

As indicated above, the present invention also provides a wheel rim when provided with the band device.

Also as indicated above, the present invention also provides a complete wheel including the band device, the rim and a tyre. The tyre may be tubed or tubeless.

BRIEF DESCRIPTION OF THE DRAWINGS

Embodiments of the invention will now be described solely by way of example and with reference to the accompanying drawings in which.

DETAILED DESCRIPTION

Figures 1, 2:
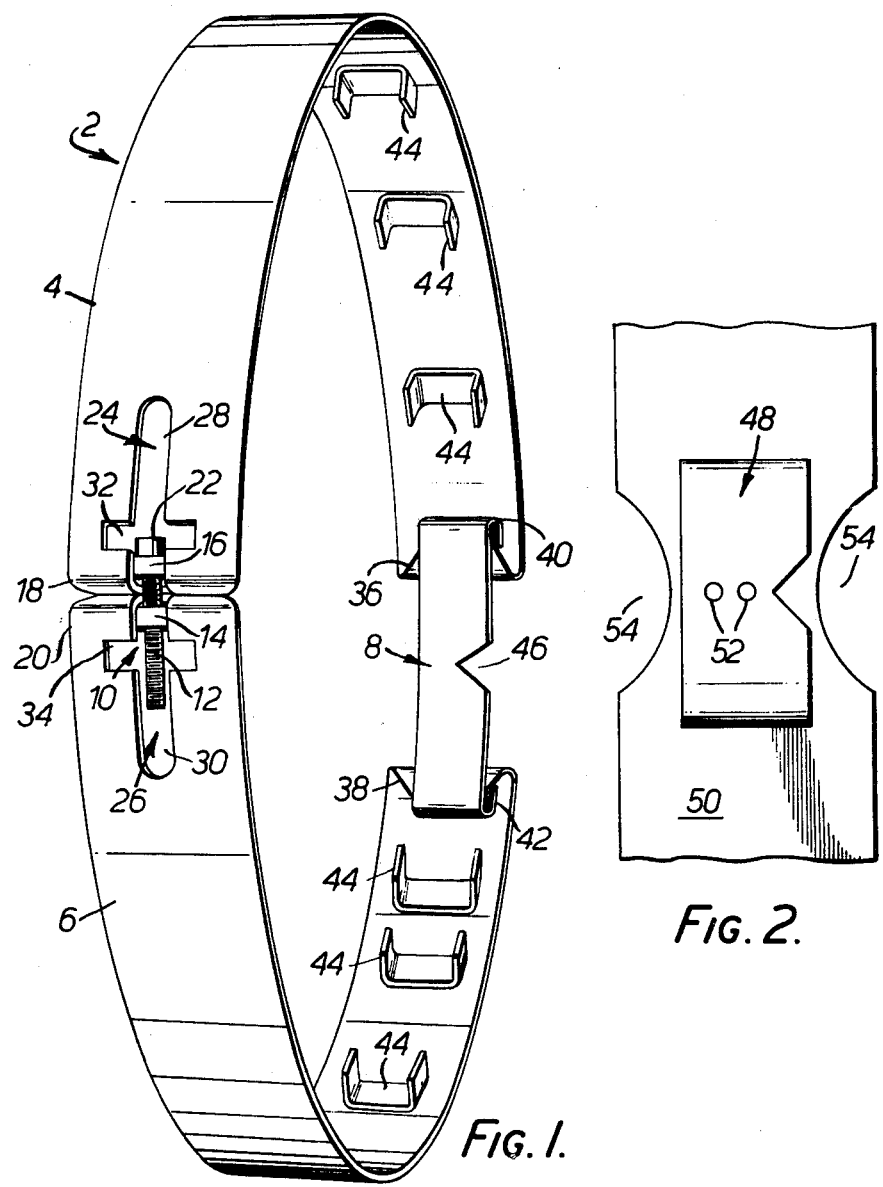
FIG. 1 shows a first band device.
FIG. 2 shows part of a second band device.
Figure 3:
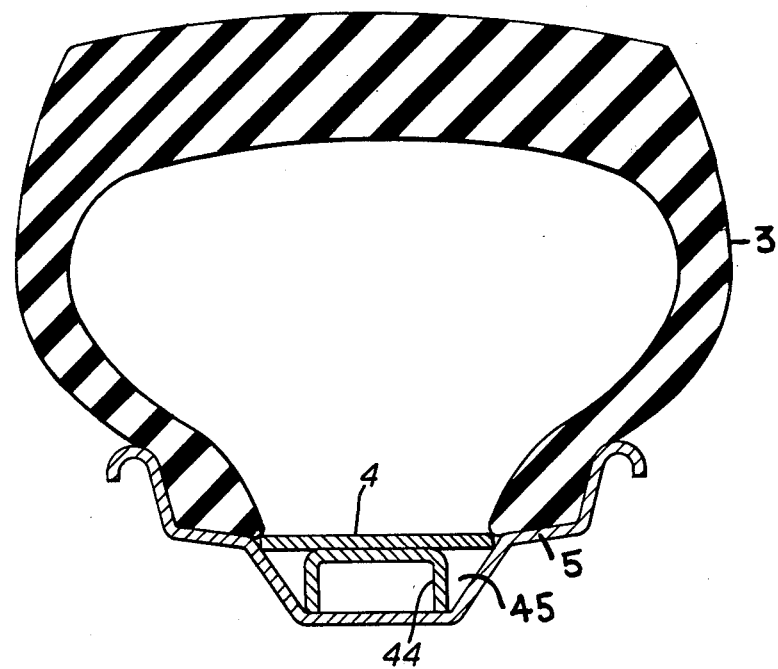
FIG. 3 shows schematically the first band device in a wheel.

Referring to FIGS. 1 and 3, there is shown a band device 2 for retaining a tyre 3 on a wheel rim 5 in the event that the tyre should become deflated. The band device 2 comprises a first band portion 4 which is part circular for substantially its entire length as illustrated. The band device 2 also comprises a second band portion 6 which is also part circular for substantially its entire length and which is substantially the same size as the first band portion 2. A link portion 8 which is part circular for substantially its entire length is effective to join the first and second band portions 4, 6 respectively together at their illustrated ends.

The band device 2 is further provided with fastener means 10 for joining the first and second band portions 4, 6 respectively together at their other ends as illustrated. The band portions 4, 6 and the link portion 8 can then be retained in position around a wheel rim to block the well of the wheel rim. The fastener means 10 comprises a threaded bolt 12, a threaded bar nut 14 and a bar washer 16. The end 18 of the first band portion 4 is bent back upon itself and the bar washer 16 seats in the recess formed by bending the end back upon itself. Similarly, the end 20 of the band part 6 is bent back upon itself and the bar nut 14 sits in the recess formed by bending the end 20 back upon itself. The bar washer 16 and the bar nut 14 thus cannot turn so that the bolt 12 can be screwed into the bar nut 14, for example by using a T-bar tool (not shown) having a socket head for fitting over the head 22 of the bolt 12.

It will be seen that the first and second band portions 4, 6 are substantially identical and they are both provided with a cross shaped aperture 24, 26 respectively. These cross shaped apertures are of such a shape that the fastener means 10 can be inserted in position when the band portions 4, 6 are in position around a wheel rim. More specifically, the bolt 12 fits in position by passing through the aligned slot parts 28, 30, the bar washer 16 fits in position by passing through the slot part 32, and the bar unit 14 fits in position by passing through the slot part 34.

The ends 36, 38 of the band portions 4, 6 respectively are bent back upon themselves as shown. Similarly, the ends 40, 42 of the link portion 8 are also bent back upon themselves as shown. The bent back ends 36:40 and 38:42 thus cooperate as shown so that the link portion 8 is effective to hold together the band portions 4, 6. The angles of inclination of the bent back parts 36:40 and 38:42 are so chosen that pressure from the tyre rim or pressure from an inflated inner tube is effective to press the various parts of the band device 2 more firmly together and not a great deal of overlap is required between the parts 36:40 and 38:42.

As is shown in FIG. 1, the band portions 4, 6 are provided with box section legs 44. The legs 44 sit inside a well 45 in the wheel rim 5 and enable the band portions 4, 6 to sit flush at the top of the well in the wheel rim.

Advantageously, the link portion 8 sits on the floor of the well.

If the band portions 4, 6 are made of zinc coated metal, then the box section legs 44 can be spot welded into position.

It will be seen that the link portion 8 is provided with an aperture in the form of a V-shaped cut out 46. This cut out 46 receives a valve if the band device 2 is used with a tubed tyre. If the band device 2 is not used with a tubed tyre, then there is no necessity to use the cut out 46. If a tube is employed, the tube cannot work its way under the link portion 8 and chaff or get pinched when the link portion 8 is sitting on the floor of the well of the wheel rim.

All the illustrated parts of the band device 2 are made of zinc coated steel. Zinc coating prevents the various parts of the band device 2 from rusting when the band device 2 is subjected to the action of a chemical sealant inside the tyre. As an alternative of using zinc coated mild steel, stainless steel may be employed.

It is envisaged that the band device 2 will enable a vehicle to run on a completely deflated tyre at 30 miles per hour for up to ten miles. The band device 2 will be effective to hold the tyre on the rim. In the event of a small puncture, then the sealant will operate and the tyre will not in any event deflate.

FIG. 2 shows a link member 48 that is wider than the link member 8 shown in FIG. 1 and that is designed to fit in a wider well of a wheel rim. The surface of the link member 48 to be engaged by a tube, if a tube is employed, is provided with an anti-chafe material in the form of a rubber patch 50. The patch 50 is rivetted by two rivets 52 to the link member 48, the rivets 52 passing through the patch 50 and into a rectangular holding plate (not shown) so that the patch 50 is sandwiched between the link member 48 and the holding plate. As is illustrated in FIG. 2, the patch 50 is provided with two cut-out portions 54. In use with a tube, the inflated tube holds the loose edges of the patch down.

It is to be appreciated that the embodiments of the invention described above with reference to the drawings have been given by way of example only and that modifications may be effected. Thus, for example, the link portion 8 is shown attached to the inner surface of the band portions 4, 6 so that it can sit on the floor of the well in the wheel rim. It is however possible for the link member 8 to be attached to the outer surface of the band portions 4, 6. Also, the shape of the slots 24, 26 can be altered if desired. In use of the band device 2, it will normally be covered with an anti-chafe material in the usual known manner for band devices. Further, the rivets 52 could be replaced by screws or the patch 50 could be secured by adhesives to the link member 48 to avoid using the rivets 52 and the holding plate.

I claim:

1. A band device for retaining a tyre on a wheel rim in the event that the tyre should become deflated, which band device comprises a first band portion which is part circular for substantially its entire length, a second band portion which is part circular for substantialy its entire length and which is substantially the same size as the first band portion, a link portion which is part circular for substantially its entire length and which is for joining the the first and second band portions together at one end, and fastener means for joining the first and second band portions together at their other ends whereby the band portions and the link portion are retainable in position around a base of a wheel rim, the link portion having an apertured part for receiving a valve of a tube of a tyre, the link portion being hooked at each end for connecting to inwardly directed ends of the first and second band portions whereby the link portion is positioned in use on the side of the band device that is adjacent the base of the wheel rim so that the inwardly directed pressure of the tyre serves to bind the first and second portions and the link portion tighter around the base of the wheel rim with increasing pressure, and the band device including a plurality of legs which are secured at spaced apart intervals to the first and second band portions on the side of the band device that is adjacent the base of the wheel rim, the base of the wheel rim having a well with an open mouth, and the legs being locatable in the well such that they support the first and second band portions in a well-blocking position at the mouth of the well and such that they allow the first and second band portions to flex with the wheel rim.

2. A band device according to claim 1 in which the first and second band portions are slotted adjacent one end, the slots each being in the shape of a cross with a pair of transversely extending arms for enabling the fastener means to be inserted in position on the first and second band portions when the first and second band portions are in position around the base of the wheel rim, the fastener means comprising a screw threaded bolt, a screw threaded bar nut, and a bar washer.

3. A band device according to claim 1 or claim 2 in which the link portion is provided with an anti-chafe patch.

4. A band device according to claim 1 or claim 2 in which the apertured part in the link portion is of a V-shape.

5. A wheel rim in combination with a band device for retaining a tyre on the wheel rim in the event that the tyre should become deflated, which band device comprises a first band portion which is part circular for substantially its entire length, a second band portion which is part circular for substantially its entire length and which is substantially the same size as the first band portion, a link portion which is part circular for substantially its entire length and which is for joining the the first and second band portions together at one end, and fastener means for joining the first and second band portions together at their other ends whereby the band portions and the link portion are retainable in position around a base of a wheel rim, the link portion having an apertured part for receiving a valve of a tube of a tyre, the link portion being hooked at each end for connecting to inwardly directed ends of the first and second band portions whereby the link portion is positioned in use on the side of the band device that is adjacent the base of the wheel rim so that the inwardly directed pressure of the tyre serves to bind the first and second portions and the link portion tighter around the base of the wheel rim with increasing pressure, and the band device including a plurality of legs which are secured at spaced apart intervals to the first and second band portions on the side of the band device that is adjacent the base of the wheel rim, the base of the wheel rim having a well with an open mouth, and the legs being locatable in the well such that they support the first and second band portions in a well-blocking position at the mouth of the well and such that they allow the first and second band portions to flex with the wheel rim.

6. A complete wheel comprising a tyre and a wheel rim in combination with a band device for retaining a tyre on the wheel rim in the event that the tyre should become deflated, which band device comprises a first band portion which is part circular for substantially its entire length, a second band portion which is part circular for substantially its entire length and which is substantially the same size as the first band portion, a link portion which is part circular for substantially its entire length and which is for joining the the first and second band portions together at one end, and fastener means for joining the first and second band portions together at their other ends whereby the band portions and the link portion are retainable in position around a base of a wheel rim, the link portion having an apertured part for receiving a valve of a tube of a tyre, the link portion being hooked at each end for connecting to inwardly directed ends of the first and second band portions whereby the link portion is positioned in use on the side of the band device that is adjacent the base of the wheel rim so that the inwardly directed pressure of the tyre serves to bind the first and second portions and the link portion tighter around the base of the wheel rim with increasing pressure, and the band device including a plurality of legs which are secured at spaced apart intervals to the first and second band portions on the side of the band device that is adjacent the base of the wheel rim, the base of the wheel rim having a well with an open mouth, and the legs being locatable in the well such that they support the first and second band portions in a well-blocking position at the mouth of the well and such that they allow the first and second band portions to flex with the wheel rim.

* * * * *